US006736317B1

(12) United States Patent
McDonald et al.

(10) Patent No.: US 6,736,317 B1
(45) Date of Patent: May 18, 2004

(54) REAL TIME INTERNET-BASED TRANSIT MANAGEMENT AND CONTROL SYSTEM WITH WIRELESS VEHICULAR DATA LINK

(76) Inventors: Ian McDonald, 5232 N. 43rd Pl., Phoenix, AZ (US) 85018; Yada Schneider, P.O. Box 92, Camp Verde, AZ (US) 85018

( * ) Notice: Subject to any disclaimer, the term of this patent is extended or adjusted under 35 U.S.C. 154(b) by 0 days.

(21) Appl. No.: 09/550,866

(22) Filed: Apr. 17, 2000

Related U.S. Application Data

(60) Provisional application No. 60/130,200, filed on Apr. 20, 1999.

(51) Int. Cl.$^7$ ............................ G07B 15/02; G06K 5/00
(52) U.S. Cl. ......................... 235/384; 235/382; 235/380
(58) Field of Search ................................ 235/384, 449, 235/385, 375, 380, 491, 360, 382, 382.5

(56) References Cited

U.S. PATENT DOCUMENTS

| | | | | |
|---|---|---|---|---|
| 5,101,200 A | * | 3/1992 | Swett | 340/937 |
| 5,721,678 A | * | 2/1998 | Widl | 705/417 |
| 6,347,739 B1 | * | 2/2002 | Tamam | 235/384 |
| 6,411,897 B1 | * | 6/2002 | Gaspard, II | 701/209 |
| 2002/0007327 A1 | * | 1/2002 | Steury et al. | 705/34 |

FOREIGN PATENT DOCUMENTS

EP 1 162 576 A2 * 12/2001

* cited by examiner

Primary Examiner—Thien M. Le

(57) ABSTRACT

A method for remotely monitoring and managing the operation of fare charging passenger carrying vehicles forming elements of a transportation system. The method is carried out as each vehicle travels a route to pick up and deliver passengers having previously established passenger accounts. The method comprises the steps of maintaining a wireless two-way data link between each vehicle and a system control center having stored passenger account data and maintaining a two-way data link between the system control center and a system management center to allow the system management center to exchange data with the system control center and with each vehicle. A fare charge schedule defining fare charges based on designated criteria is transferred from the system management center to the system control center. The identity of each passenger boarding each vehicle is transmitted to the system control center where the passenger identity is matched with the related passenger account within the system control center. An appropriate fare charge is assessed against the passenger account. A passenger account status report is then transmitted to the vehicle indicating that the fare charge has been accepted or declined. Vehicle passenger boarding is controlled in response to receipt of the passenger status report.

20 Claims, 18 Drawing Sheets

SYSTEM CONTROL CENTER TO SPECIFIED VEHICLE
DATA COMMUNICATIONS INTERFACE

DATA TRANSFERRED FROM MOBILE SYSTEM ELEMENTS TO SYSTEM CONTROL CENTER

TIME

DRIVER ID AND AUTHORIZATION

VEHICLE ID

VEHICLE LOCATION

CARD USER ID

CARD USER VEHICLE ENTRY TIME / LOCATION

FARE COLLECTION DATA
 1. PASSENGER COUNT
 2. TOTAL FARE COLLECTIONS

VEHICLE SYSTEM OPERATING DATA
 1. SPEED PROFILE / CUMULATIVE DAILY MILEAGE
 2. FUEL / OIL QUANTITY
 3. ENGINE RPM / TEMPERATURE / FAILURE ALERTS
 4. DOOR POSITION
 5. SAFETY WARNING SIGNALS
 6. TOTAL VEHICLE WEIGHT

VIDEO SIGNAL FROM VEHICLE (SNAPSHOT CAPTURE)

ALPHA / NUMERIC MESSAGES VIA KEYBOARD
 1. HOT KEYS FOR CANNED MESSAGES
 2. CUSTOMIZED MESSAGES

END OF OPERATING DAY DATA SUMMARY
 1. TOTAL PASSENGER COUNT
 2. HOURLY PASSENGER COUNT
 3. DRIVER ON DUTY / OFF DUTY TIMES
 4. VEHICLE OPERATING TIME / MILEAGE
 5. VEHICLE SYSTEMS FAILURE / WARNING STATUS
 6. PASSENGER DEMOGRAPHICS
 7. LOADING / CAPACITY STATUS

*FIG. 5*

DATA TRANSFERRED FROM SYSTEM CONTROL CENTER TO MOBILE SYSTEM ELEMENTS

FARE CONTROL DATA

1. TIME OF DAY FARE

2. DAY OF WEEK FARE

3. HOLIDAY FARES

4. DISCOUNT FARES

5. PROMOTIONAL FARES
        1. BY CUSTOMER ID
        2. BY VEHICLE LOCATION ENTRY POINT
        3. BY PROMOTIONAL CARD SPONSOR

6. DISCOUNTS BASED ON VOLUME PURCHASES
        1. BY CUSTOMER
        2. BY CUSTOMER'S EMPLOYER

ALPHA / NUMERIC MESSAGES

ALPHA / NUMERIC MESSAGES

HEAD SIGN CONTROL

ROUTINE DRIVER ADVISORIES

1. MINUTES AHEAD OF SCHDULE OR BEHIND SCHEDULE

2. SCHEDULE COMPLIANCE WARNING

3. EXCESSIVE VEHICLE SPEED WARNING

4. EXCESSIVE VEHICLE WEIGHT

5. ROUTE DEVIATION ALERT

6. TIME BEHIND PRECEEDING VEHICLE

7. TIME AHEAD OF FOLLOWING VEHICLE

8. CHANGE ROUTE / PICK UP PASSENGER / JOB LIST

*FIG. 6*

CLIENT MANAGEMENT DATA GENERATED BY SYSTEM CONTROL CENTER

REAL TIME VEHICLE LOCATION MAPPING

REAL TIME VEHICLE SCHEDULE COMPLIANCE

REAL TIME FARE COLLECTION DATA SUMMARIES

1. BY VEHICLE
    2. BY ROUTE
    3. BY GEOGRAPHIC AREA

SYSTEM CAPACITY UTILIZATION ANALYSIS

1. SYSTEM LOAD FACTOR BY TIME OF DAY
    2. SYSTEM LOAD FACTOR BY DAY OF WEEK OR TIME OF YEAR
    3. ROUTE LOAD FACTOR
    4. VEHICLE LOAD FACTOR
    5. COMPARATIVE ANALYSIS: CURRENT VERSUS HISTORICAL LOAD FACTOR DATA
    6. SYSTEM / ROUTE / VEHICLE OVERLOAD WARNING
    7. SCHEDULE COMPLIANCE TIME WINDOW VIOLATIONS

SYSTEM CAPACITY PREDICTIONS

1. VEHICLE / ROUTE OVERLOAD PREDICTIONS
    2. SCHEDULE COMPLIANCE FAILURE OR CONFLICT PREDICTIONS

RELATIVE POSITION OF MULTIPLE VEHICLES ON SAME ROUTE

1. TIME ONE VEHICLE BEHIND PRECEEDING VEHICLE
    2. TIME ONE VEHICLE AHEAD OF FOLLOWING VEHICLE

PREVENTIVE MAINTENANCE

1. THRESHOLD (SET)
    2. TRACK MILES, HOURS IN USE, TEMPERATURE, PRESSURE, SPEED RECORDING

DRIVER AUTHORIZATION

1. CHECK VEHICLE ID
    2. ACTIVATE IGNITION CUT OFF

*FIG. 7*

Track 1 Character Definition

ISO 7811-2 Track 1 character encoding definitions

SS  FC  PAN  FS  NAME  FS  DATE  SVC CD  DISCRETIONARY DATA  ES  LRC

| FIELD | DESCRIPTION | LENGTH | FORMAT |
|---|---|---|---|
| SS | Start Sentinel | 1 | % |
| FC | Format Code ("B" for credit cards) | 1 | Alpha/Numeric |
| PAN | Primary Account Number | 19 max | Numeric |
| FS | Field Seperator | 1 | ^ |
| NAME | Card Holder Name | 2-26 max | Alpha/Numeric |
| FS | Field Seperator | 1 | ^ |
| DATE | Expiration Data (YYMM) | 4 | Numeric |
| SVC CD | Service Code | 3 | Numeric |
| Descetionary Data | Optional Issuer Data | variable | Alpha/Numeric |
| ES | End Sentinel | 1 | ? |
| LRC | Longitudinal Redundancy Check | 1 | |
| | Total Can Not Exceed 79 bytes | 73 | |

Track 2 Character Definition

ISO 7811-2 Track 2 character encoding definitions

SS  PAN  FS  DATE  SVC CD  DISCRETIONARY DATA  ES  LRC

| FIELD | DESCRIPTION | LENGTH | FORMAT |
|---|---|---|---|
| SS | Start Sentinel | 1 | ; |
| PAN | Primary Account Number | 19 max | Numeric |
| FS | Field Sepearator | 1 | = |
| DATE | Expiration Date (YYMM) | 4 | Numeric |
| SVC CD | Service Code | 3 | Numeric |
| Discretionary Data | Optional Issuer Data | variable | Numeric |
| ES | End Sentinel | 1 | 0x0F HEX |
| LRC | Longitudinal Redundancy Check | 1 | |
| | Total CAN NOT exceed 40 bytes | 40 | |

FIG. 10A

| Name | FormNumber | FieldNumber | Length | Type | ExtraInfo |
|---|---|---|---|---|---|
| JobNumber | 0 | 0 | 6 | Number | |
| JobStatus | 0 | 1 | 2 | Selection | 0 |
| CustomerName | 0 | 2 | 20 | Normal Text | |
| NumberInParty | 0 | 3 | 2 | Number | |
| PickupAddress | 0 | 4 | 2 | Selection | 9 |
| PickupTime | 0 | 5 | 4 | Time4 | |
| DropOffAddress | 0 | 6 | 2 | Selection | 9 |
| DropOffTime | 0 | 7 | 4 | Time4 | |
| ListAddress | 0 | 8 | 2 | Selection | 9 |
| ListTime | 0 | 9 | 4 | Time4 | |
| Comment | 0 | 10 | 25 | Normal Text | |
| PickupDropoffStatus | 0 | 11 | 1 | Selection | 5 |
| NoShowReason | 0 | 16 | 1 | Selection | 6 |
| NorthSouth | 0 | 54 | 1 | Normal Text | |
| EastWest | 0 | 55 | 1 | Normal Text | |
| Latitude | 0 | 56 | 8 | Number | |
| Longitude | 0 | 57 | 8 | Number | |
| NorthSouth | 2 | 54 | 1 | Normal Text | |
| EastWest | 2 | 55 | 1 | Normal Text | |
| Latitude | 2 | 56 | 8 | Number | |
| Longitude | 2 | 57 | 8 | Number | |
| Longitude | 2 | 57 | 8 | Number | |
| Speed | 2 | 58 | 4 | Number | |
| Direction | 2 | 59 | 4 | Number | |
| OverlayMessage | 3 | 1 | 18 | Normal Text | |
| DriverID | 4 | 1 | 2 | Number | |
| DriverStatus | 4 | 3 | 1 | Selection | 3 |
| RouteNumber | 4 | 4 | 2 | Number | |
| BreakStatus | 4 | 6 | 1 | Selection | 4 |
| ExitFlagForm | 4 | 7 | 1 | Selection | 3 |
| Address | 4 | 8 | 1 | Selection | 9 |
| Message | 4 | 10 | 30 | Normal Text | |
| Message | 4 | 11 | 30 | Normal Text | |
| Message | 4 | 12 | 30 | Normal Text | |
| Message | 4 | 13 | 30 | Normal Text | |
| JobNumber | 5 | 0 | 6 | Number | |
| Name | 5 | 2 | 26 | Normal Text | |
| NumInParty | 5 | 3 | 2 | Number | |
| Address | 5 | 8 | 1 | Selection | 9 |
| Time | 5 | 9 | 4 | Time4 | |
| AccountNumer | 5 | 10 | 16 | Number | |
| ExpiryDate | 5 | 11 | 10 | Date6 | |
| Message | 14 | 1 | 120 | Normal Text | |
| Message | 15 | 1 | 160 | Normal Text | |

FIG. 10B

REAL TIME INTERNET-BASED TRANSIT MANAGEMENT AND CONTROL SYSTEM WITH WIRELESS VEHICULAR DATA LINK

CROSS REFERENCE TO RELATED APPLICATION

This application claims the benefit of prior filed U.S. Provisional Application Ser. No. 60/130,200, filed Apr. 20, 1999, entitled "REAL TIME INTERNET-BASED TRANSIT MANAGEMENT AND CONTROL SYSTEM WITH WIRELESS VEHICULAR DATA LINK" by Ian McDonald and Yada Schneider.

BACKGROUND OF THE INVENTION

Field of the Invention

This invention relates to wireless real time Internet-based transit management and control systems for use in connection with operating and managing mass transit systems including city bus systems, airport, hotel or local shuttle transport systems, medical shuttle transport systems and related applications.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 5 represents a summary chart illustrating representative data transferred from the mobile system elements to the system control center.

FIG. 6 represents a summary chart illustrating representative data transferred from the system control center to the mobile system elements.

FIG. 7 represents a summary chart illustrating representative client management data capable of being generated by the system control center.

FIG. 10A illustrates the configuration of ISO format data as stored on commercial credit cards and transit system cards.

FIG. 10B illustrates the data format specifically configured for processing by the Tranz:Act Server of the present invention.

DESCRIPTION OF THE PREFERRED EMBODIMENT

In order to better illustrate the advantages of the invention and its contributions to the art, a preferred embodiment of the invention will now be described in some detail.

Figure 1:
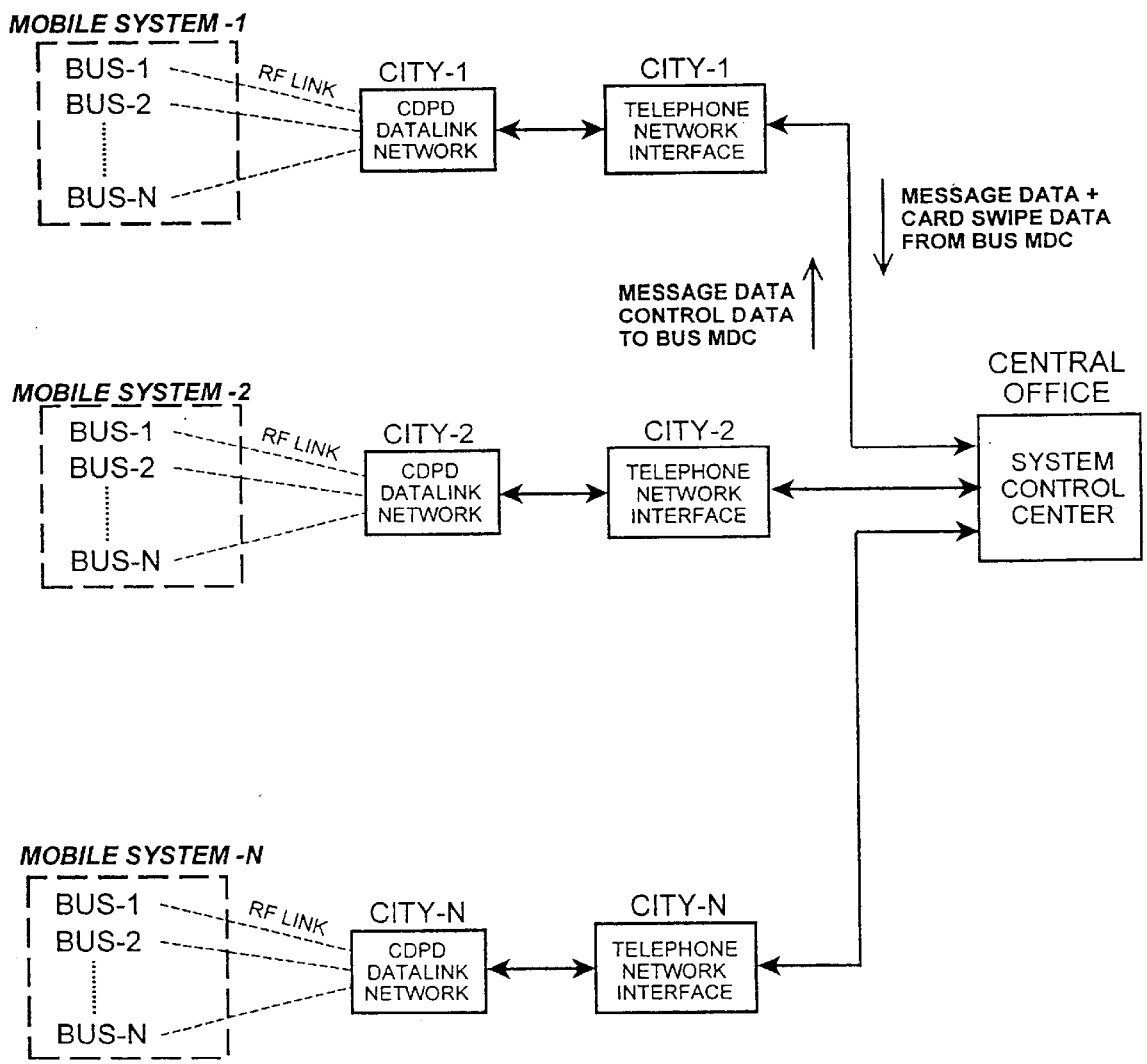
FIG. 1 represents a block diagram illustrating the interconnections between system control center and specified vehicle data communications elements.

FIG. 1 represents a block diagram indicating how the system control center located at a single central office interfaces with a variety of mobile system elements located in geographically distributed cities or other locations.

Each bus within a system includes a commercially available wireless Mobile Data Console (MDC) such as a Mentor Mobile Data Computer by Mentor Engineering of Calgary AB, Canada which provides a wireless radio frequency (RF) link between the mobile system element or bus and existing CDPD data link networks installed and operating in most localities which provide cellular voice telecommunication systems. Each MDC includes an internal card reader for reading conventional magnetically encoded cards such as commercial credit cards. An outboard card reader is attached to the MDC or to the bus fare box to facilitate customer usage. The outboard MDC card reader may also be configured to optically scan cards having bar code encoded data or to function in combination with wireless radio activated proximity cards. The MDC can be configured to receive card swipe data from all categories of card readers. Some states are planning to use driver's licenses having bar code data identifying the licensed driver and supplying additional data. System specific or proprietary transit cards having magnetically encoded data represents presently represents the most readily available, lowest cost form of card identification system. The system of the present invention can also access system data by MDC readouts from conventional magnetic stripe credit cards.

FIG. 10A indicates the data storage format for data tracks 1 and 2 of a standard magstripe commercial credit card or other card such as the transit card for use in connection with the present invention. In response to a card swipe, the outboard card reader reads the card data, decodes the card data and sends the decoded card data to the MDC. The MDC internally reformats the data for use in connection with the system of the present invention in accordance with the data format indicated in FIG. 10B. As will be explained below, the MDC transmits the reconfigured FIG. 10B data format string to the system control center. Appendix A illustrates how the Mentor MDC software used in connection with the preferred embodiment of the invention is specially configured for use in connection with the system of the present invention.

The transit card element of the system includes stored digital data which identifies the person to whom the card belongs. As will be explained below, additional data is stored in a database located at the system control center and includes substantial additional user-related data. When a fare paying passenger elects to utilize a conventional VISA, MasterCard, American Express or other commercial credit card, the system control system data processing software will detect that fact and procure the necessary additional information directly from the credit card customer database by communicating with the credit card provider's offsite database.

As illustrated in the FIG. 1 system block diagram, each individual bus within a single mobile system maintains a radio frequency data link with a local CDPD data link network which is interconnected with the local telephone network via an appropriate interface. As an element of that telephone network interface, the system control center will typically utilize at least one and preferably at least two leased T-1 high speed data communication channels to provide both high speed data communication capabilities as well as system fault tolerance.

When a transit passenger enters a particular bus, that individual performs a conventional card swipe operation allowing the passenger's card data to be read by to the MDC mounted in the bus.

Figure 2:
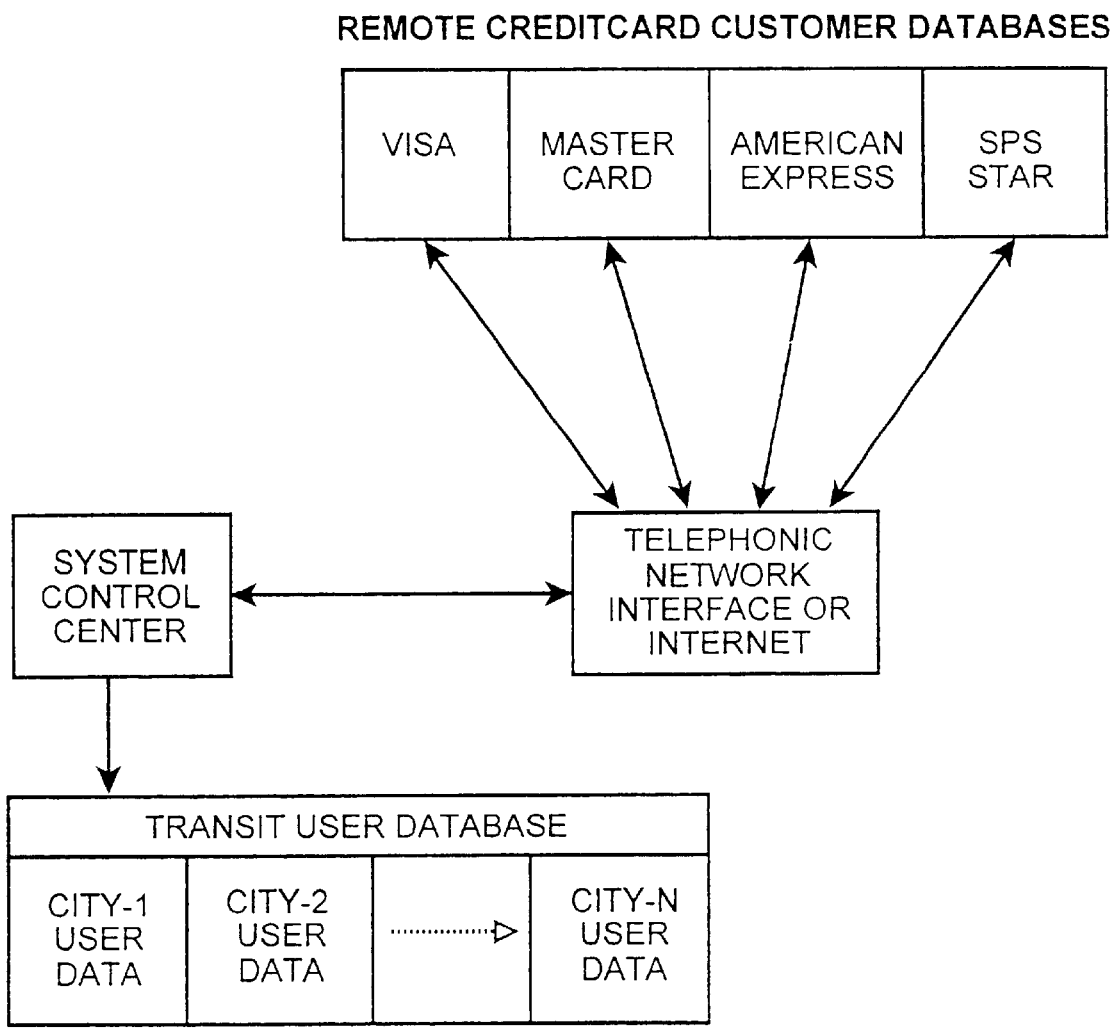
FIG. 2 represents a block diagram illustrating card user account database access by the system control center.

As illustrated in the FIG. 2 block diagram which represents a continuation of the FIG. 1 block diagram, transmission of card swipe data from the bus MDC to the system control center allows the system control center to access and evaluate information relating to the card user, whether the card being read represents a proprietary or use specific transit card or a standard commercial credit card.

The system control software evaluates the received card data and determines first whether the card number represents a proprietary card number corresponding to information stored in the onsite transit user database or another specified form of card data where the necessary additional user data must be procured from remote credit card customer databases.

The system utilizes the first four bytes of the incoming card swipe data to identify the appropriate database to access. The identified database is then accessed to determine whether the card swipe data corresponds to an authorized user number stored in the database and whether that authorized user has a sufficient amount of credit on account to pay the bus fare charges indicated by the system for assessment against the user's credit balance. When the card swipe data corresponds to an authorized user with a sufficient credit balance, the system control center transmits control data back to the bus MDC over dedicated telephone lines and CDPD data link network to communicate an "ACCEPTED" message which is displayed both to the card holder and to the bus driver.

The system control center software also cross checks the date and time data corresponding to the last use of the transit card. If the last use falls within a designated time window, for example, one hour since the last account charge, the system can be programmed to presume that the second, close in time charge corresponds to an authorized bus to bus transfer such that the system will generate an "ACCEPTED" message without charging the user's credit balance.

The search speed of the proprietary transit user database is enhanced by assigning sequential, non-overlapping card serial number sequences to different geographically distributed cities which will be simultaneously accessing the data stored in the system database.

As illustrated by the FIG. 1 block diagram, a single system control center located at a single central office location can process and control data from a virtually unlimited number of buses or other transit vehicles operating within the jurisdiction of a single mobile system while simultaneously processing data from and managing transit systems operating in a virtually unlimited number of additional jurisdictions.

Figure 3:
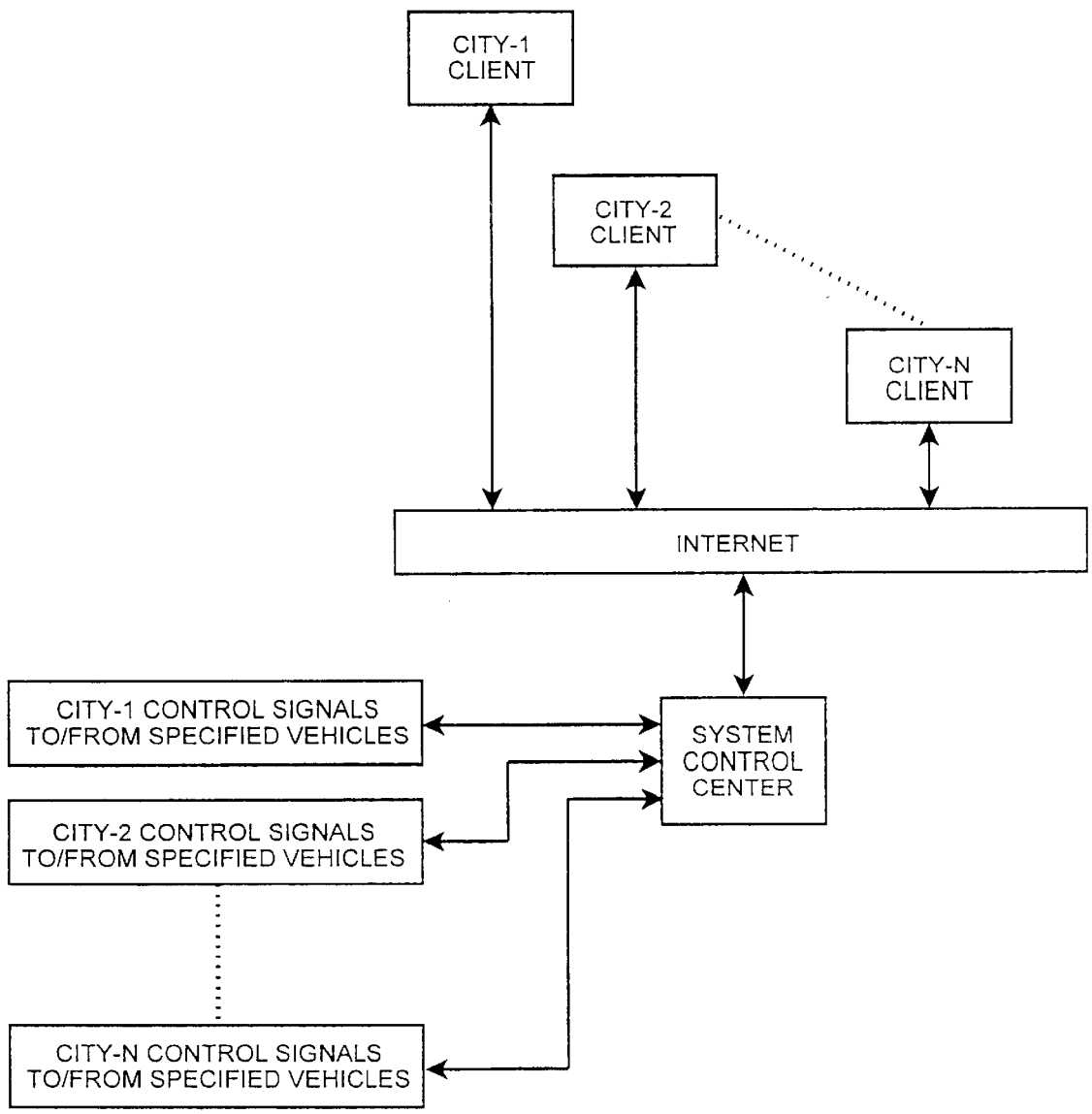
FIG. 3 represents a block diagram illustrating the client system access/control management and control signals/data flow to and from the individual vehicles.

The FIG. 3 block diagram illustrates how clients of the transit management system of the present invention can both access and control their own transit systems through the single centrally located system control center. The data interface between each transit management organization and the system control center will typically be provided at low cost by the Internet.

The FIG. 5 summary chart specifies and illustrates some of the various different types of data which can be transferred from each vehicle within each mobile control system to the system control center. In connection with each data transmission, the time of day and GPS (Global Positioning System) location will always be communicated so that each data transmission will be time tagged to allow for subsequent data processing and analysis.

When the driver reports for duty on a particular transit vehicle, the driver performs a card swipe operation with his own driver transit card to identify himself to the system. After proper authentication by the system control center, an authorized driver is allowed to operate the vehicle. Via appropriate electronic interface circuitry between the MDC and the vehicle engine and engine control systems, the system of the present invention can take a variety of steps to prevent the driver from starting the engine, to shut down the vehicle engine or to prevent brake release. The identification of each vehicle is continuously provided on a real time basis since the bus-mounted MDC represent a dedicated piece of hardware which identifies itself with each burst of data transmitted.

In all applications, a GPS receiver will be provided for each vehicle and interfaced with each MDC to allow the MDC to provide continuous real time position information to the system control center. The data transmitted by the GPS receiver through the MDC to the system control center will typically also include vehicle speed data, direction of travel data and other conventional commercially available forms of data to allow the vehicle position to be mapped in real time both at the system control center as well as at the transit client management location.

As a user boards the bus and performs the card swipe operation on the MDC, a burst of packet data is transmitted to the system control center to communicate at least the card user ID as well as the vehicle entry time and vehicle location. The system control center then determines the appropriate fare to be assessed against the transit user's credit account based on predefined route and fare data as defined by the transit manager.

A key advantage of the present invention is that the fare structure can be accessed and controlled by a transit system management client on a real time basis to specify fare charges based on the day of the week, the time of the day, holidays or special promotions. For example, a transit client may wish to run a special promotion where females over the age of sixty could ride either at no charge or for a reduced fare between twelve P.M. and three P.M. on the first Wednesday of each month. Such customized fare control parameters can be instantaneously formulated at the transit client's Internet interconnected PC terminal, transmitted to the system control center software and take effect immediately. In the past, such fare change notices were manually implemented into even the most state of the art buses having card reader fare assessment systems on board each bus. If the transit client desires, a specially customized message may be displayed on the MDC LCD readout to note both the "ACCEPTED" status of the user's transit card as well as the reason or code name corresponding to the special promotional fare.

A transit manager might also charge a special promotional or reduced fare for affiliated groups such as designated employers, schools, or other organizations which would benefit from reduced rates either at all times or at specified times. These discounts could be correlated with efforts to increase use of a client's mass transit system, to reduce the need for school buses or to subsidize selected categories of transit system customers such as the indigent or physically impaired.

As further summarized in FIG. 5, the real time collection of fare data where a single collected fare corresponds to a single boarding passenger allows transit managers to collect passenger count information and total fare collections in real time on a bus to bus basis.

More sophisticated versions of the present system can offer options to communicate vehicle system operating data such as readouts or graphs of bus speed, measured as a function of time of day, cumulative daily vehicle mileage, vehicle fuel and oil quantity, engine RPM and engine temperature, system failure alerts such as over temperature or low oil pressure, a door position warning indicating a door is open when the vehicle is in motion, safety warning signals falling within a variety of categories and total vehicle weight which would indirectly reflect passenger loading. By interconnecting a video camera to the system MDC, a snapshot capture video signal may be transmitted from the vehicle to the transit client to assist management in verifying bus status, passenger load factor as well as other information communicated most clearly by an image rather than by pure data.

The MDC may be configured to include a keyboard to allow the driver to transmit customized messages to transit management as well as a series of "hot keys" for transmitting predetermined, canned messages such as "driver on break" by requiring the driver to push only a single hot key. Similarly, customized text messages may be formulated by a transit manager, transmitted via the Internet to the system control center and communicated to the MDC of a specified bus on a real time basis. Such messages could be used to notify a driver that his bus was being taken out of service at the next stop due to an engine system malfunction, that the interval between his bus and the next proceeding bus had been reduced to five minutes less than the scheduled time interval or that the driver should contact his manager by telephone at the next stop.

As further noted on the FIG. 5 summary chart, a comprehensive variety of end of day operating data can be summarized by the on board MDC and transmitted via the system control center to the local transit management operation. Such operating day data summary could include the total passenger count for the day, an hourly breakdown of passenger count, the on-duty/off-duty times for each drivers, the vehicle operating time and mileage for the day, a listing of vehicle system failures and warnings that predefined vehicle operating parameters have been exceeded, passenger demographics showing, for example, how many passengers boarded at each stop and a real time analysis of the vehicle loading and capacity status. Since each bus within each mobile system can be configured to transmit the same end of operating day data summary to the appropriate transit management facility, that facility can completely evaluate the day's operations and fare collections on a real time basis as well as vehicle maintenance requirements.

FIG. 6 summarizes the various classes of data which can be transferred from the system control center to individual vehicles operating within a single mobile system. As discussed above, fare control data can be formulated by the appropriate transit manager and transmitted on a real time basis to the MDC in each vehicle to adjust fares based on the time of day, day of week, holidays or special promotional discounts or other discounts. Promotional fares can be further broken down by customer identification, employer identification, vehicle location entry point or by a promotional card sponsor such as customers of McDonalds® or Burger King® restaurants or Mobile® or Chevron® service stations. Special discounts can be provided to individual customers based on volume purchasers or by the user's employment affiliation. Employers may also realize tax incentives from participation in the Federal employee ridership program.

The system can be configured to automatically reconfigure the bus head sign based upon its GPS position data such that when a driver reaches a predetermined location, the head sign indicating the bus destination can be automatically reconfigured or reversed without driver input.

As further noted on the FIG. 6 summary chart, the system control system may be programmed to compare the actual bus position versus time with the scheduled bus position versus time to provide the driver with a real time readout of minutes ahead of schedule or minutes behind schedule to assist the driver in decreasing that unwanted time differential to zero. The system may also provide the driver and the transmit manager with a schedule compliance warning in the event the bus location versus time falls outside a designated maximum allowable time window. Similarly, an excessive vehicle speed warning can be communicated to the transit manager in real time as can an excessive vehicle weight warning. Such data allows the transit manager to take appropriate steps to decrease the passenger load of a predetermined vehicle by providing a second bus to meet an overloaded first bus at a specified meeting point. If a particular bus deviates from a designated route as identified by GPS data, the transit manager can be alerted immediately of a potential problem. If desired, the system can prepare comparative information regarding the schedule compliance of one bus relative to a preceding vehicle or to a following vehicle to assist the bus drivers or the transit manager in ironing out unwanted compression or expansion of bus position. The system will also indicate to management when drivers make unauthorized pickups or drop offs.

When the system of the present invention is utilized for shuttle vans such as airport rental car or hotel vans or for medical transport vehicles for transporting patients from one medical facility to another, managers of such systems can communicate specialized messages directing a shuttle driver to change his route, to pick up a passenger or to provide a listing of future pickups. The GPS/MDC system may be programmed by the transit manager to provide the vehicle driver with either directions or with a map showing the location of a specified pickup point and the best route to proceed from the vehicle's present position to the selected pickup position. The system will also indicate to management when a driver makes an unauthorized pick up or drop off.

FIG. 7 summarizes some but not all of the advantages of the present system from the point of view of transit client management. The system provides transit managers with both real time vehicle location mapping as well as real time vehicle schedule compliance as a result of the real time comparisons between vehicle location and scheduled vehicle location. Real time fare collection data summarizes can be provided by vehicle, by route or by geographic area to substantially facilitate management and operating efficiency enhancements. System capacity utilization can be analyzed based on time of day, day of the week or time of year as can the load factor and load factor changes on a route by route basis. Managers may also utilize the real time data to compare current load factor data with historical load factor data and predict changing trends or observe that trends are not changing. System software can be configured to advise management of route overload warnings, system overload warnings or vehicle overload warnings.

Based on the comprehensive real time data input from each bus within a single transit system, management will be able to observe schedule compliance in real time, to define maximum allowable schedule compliance time windows and to be automatically advised by the system software when those preset time windows have been exceeded.

By comparing real time vehicle passenger boarding statistics with passenger boarding statistics for the same route for the prior day, prior week, prior month or prior year, the system can be programmed to alert management to an imminent vehicle, route or system overload to provide management with an advance overload prediction and an opportunity to attempt to remedy the predicted overload.

By keeping track of the real time position of all vehicles on a route, the interval between two buses following the same route can be monitored and compared with appropriate schedule compliance data. The system can then either automatically or enable management to manually transmit customized messages to the drivers of the conflicting buses to request that they attempt to either increase or decrease the vehicle to vehicle time interval.

Because the vehicle can be configured to transmit maintenance-related data through the MDC to transit management, approaching routine preventative maintenance, mileage points or time intervals can be predicted days or weeks in advance to facilitate vehicle maintenance and scheduling.

The system also allows transit management to issue driver transit cards to allow the MDC to communicate driver information to transit management. The system software can be programmed to cross-check the identification of a scheduled driver with the driver seeking to sign on at a particular vehicle. If the actual driver data does not cross-check with the scheduled driver data, the vehicle ignition system can be disabled either prior to start or prior to allowing the new driver to commence vehicle operation.

Figure 4:
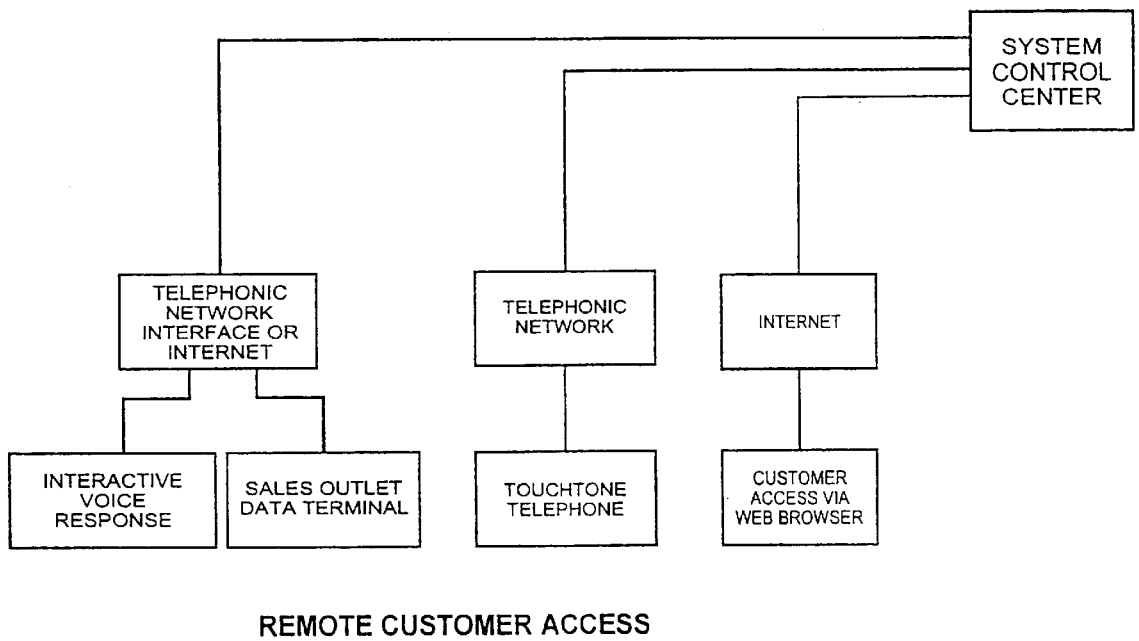
FIG. 4 represents a block diagram illustrating account access and credit card adjustment by a transit card user.

The FIG. 4 diagram illustrates how the system provides for customer database access. As illustrated in that diagram, a customer can access the system control center database using an appropriate PIN number and the user's card number to perform any one of the following functions:

1. Check credit balance;
2. Add credit by charging an additional amount to the customer's commercial credit card;
3. Transfer credit on a first transit card to a different transit card;
4. Deactivate or suspend the activation status of an existing transit card; and
5. Cancel an existing transit card.

These customer control features demonstrate how the transit card dramatically differs from existing smart card products which utilize a microprocessor chip to store data and value on the card itself in that the transit card has no intrinsic value whatsoever. If a customer loses his transit card, he simply contacts the system control center via any of the techniques illustrated in the FIG. 4 diagram and either deactivates or cancels the lost or stolen card. The card deactivation can be accomplished immediately and if an unauthorized user attempts to use the card even within a few seconds later, the bus MDC will be advised by the system control center that the card has been "DECLINED." Even if a particular transit card represents a universal card usable on any transit system anywhere under the control of the system control center, the card will be deactivated and rendered useless in all systems on a simultaneous basis.

As further indicated in the FIG. 4 diagram, transit cards can either be sold or have the existing account credit balance increased by authorized sales outlets having data terminals configured to communicate with the database stored at the system control center. Such data terminals can either be connected to the system control center by standard telephone lines, by Internet, or by wireless CDPD modem.

Referring now to FIGS. 8, 9, 10 and 11, the hardware and specific software contemplated for use in connection with the preferred embodiment of the invention will now be described.

Figure 8:
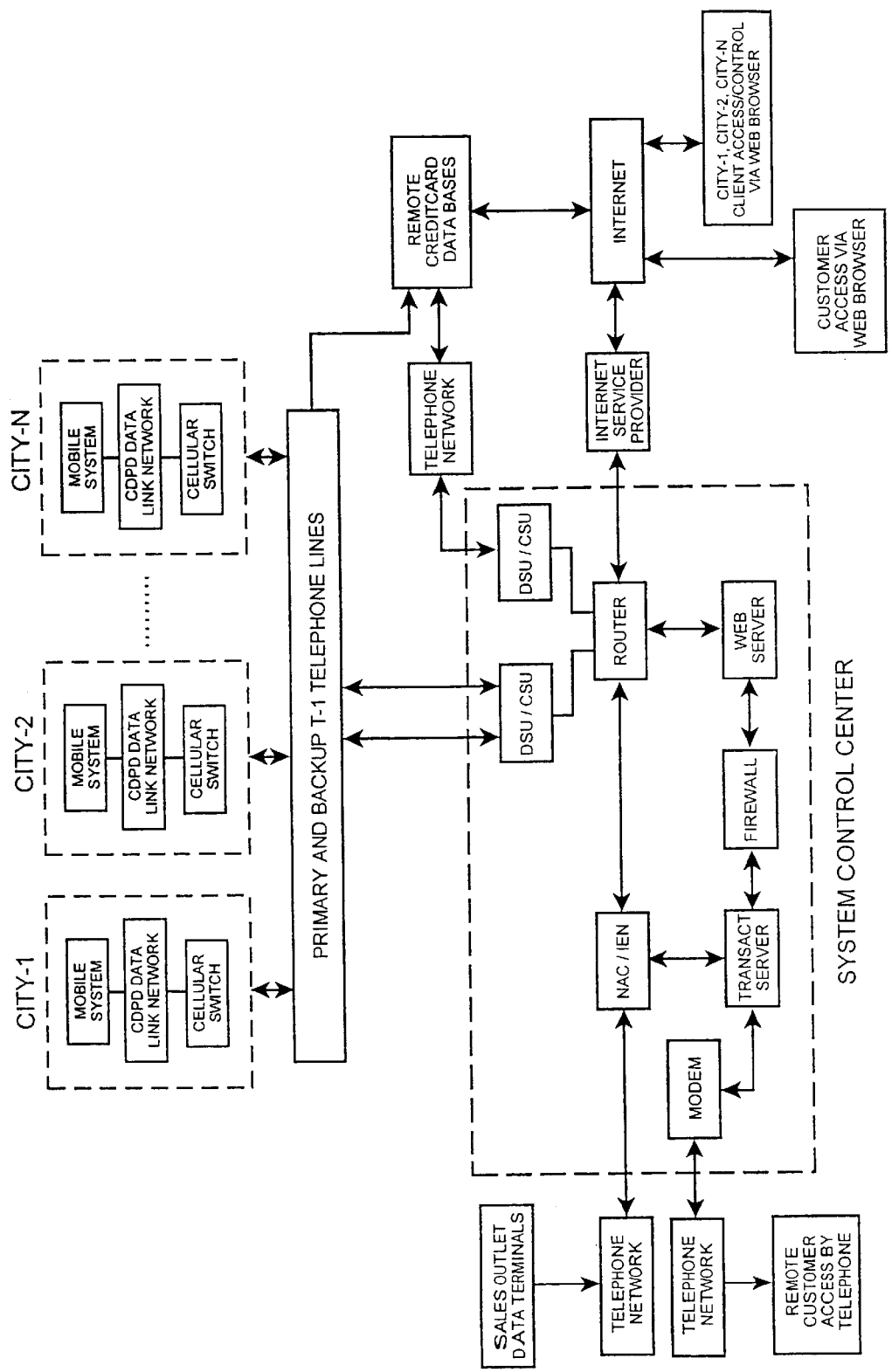
FIG. 8 represents a more detailed block diagram of one embodiment of the transit management control system of the present invention.
Figure 9:
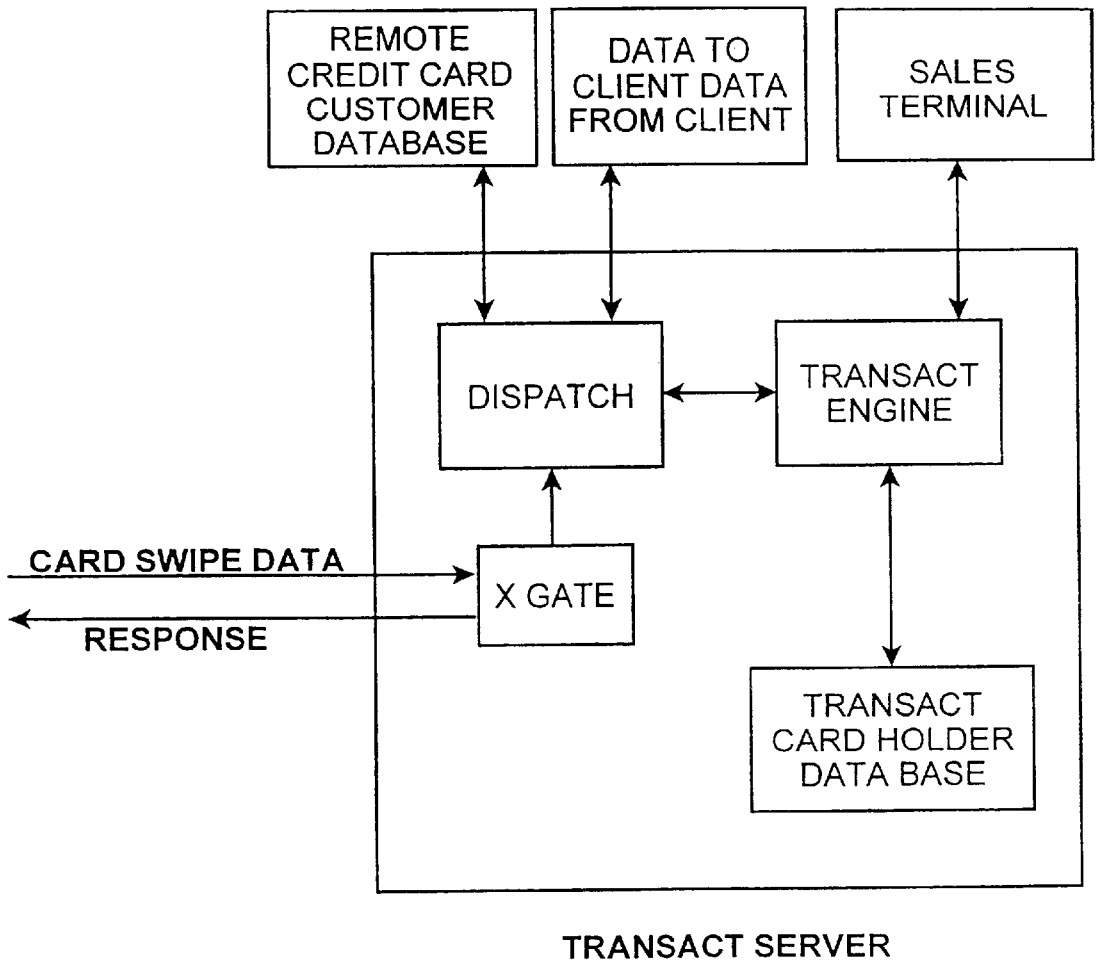
FIG. 9 represents an expanded block diagram of the Tranz:Act Server illustrated in FIG. 8.
Figure 12:
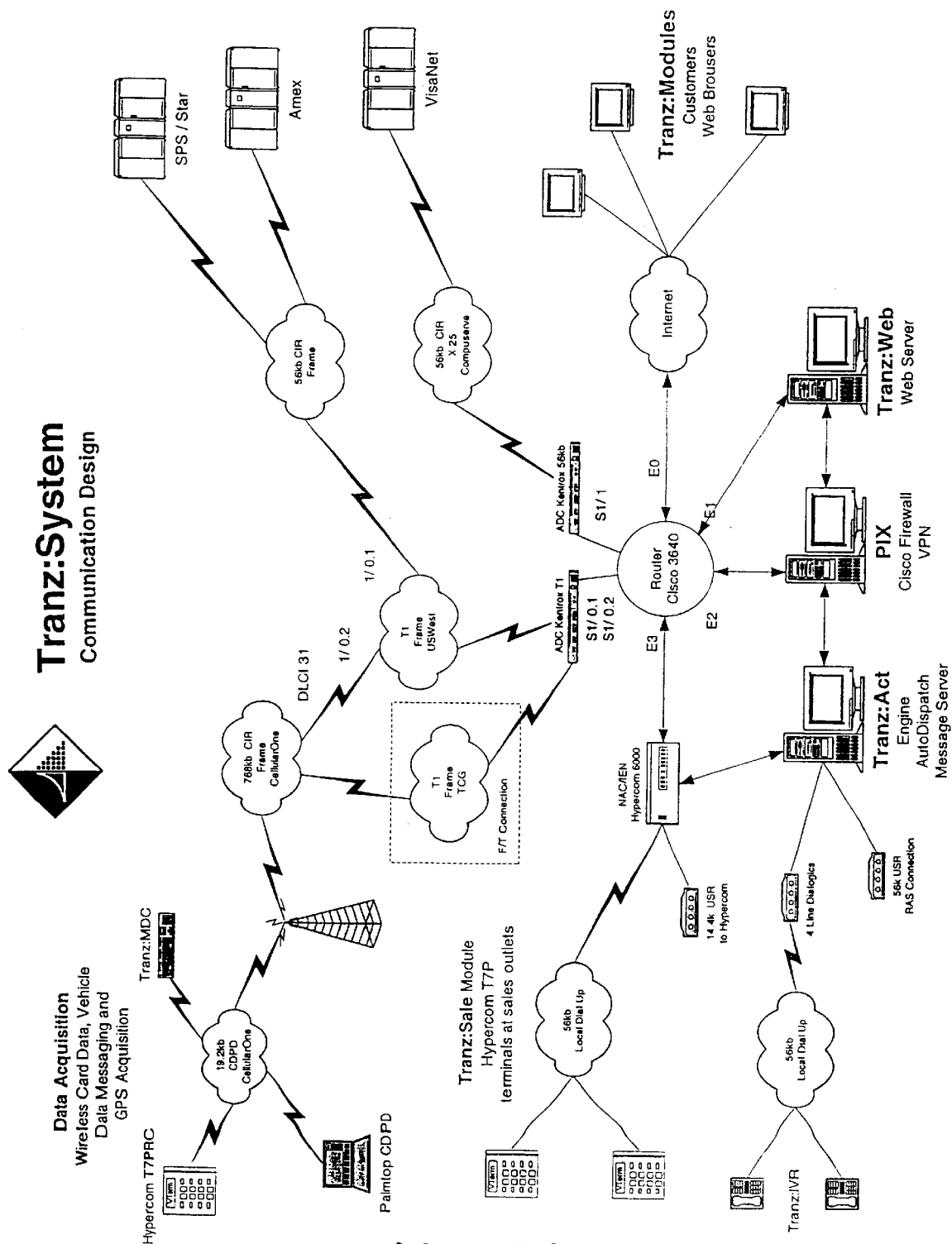
FIG. 12 represents a generalized block diagram of another embodiment of the invention illustrating certain specific items of system hardware.
Figure 13:
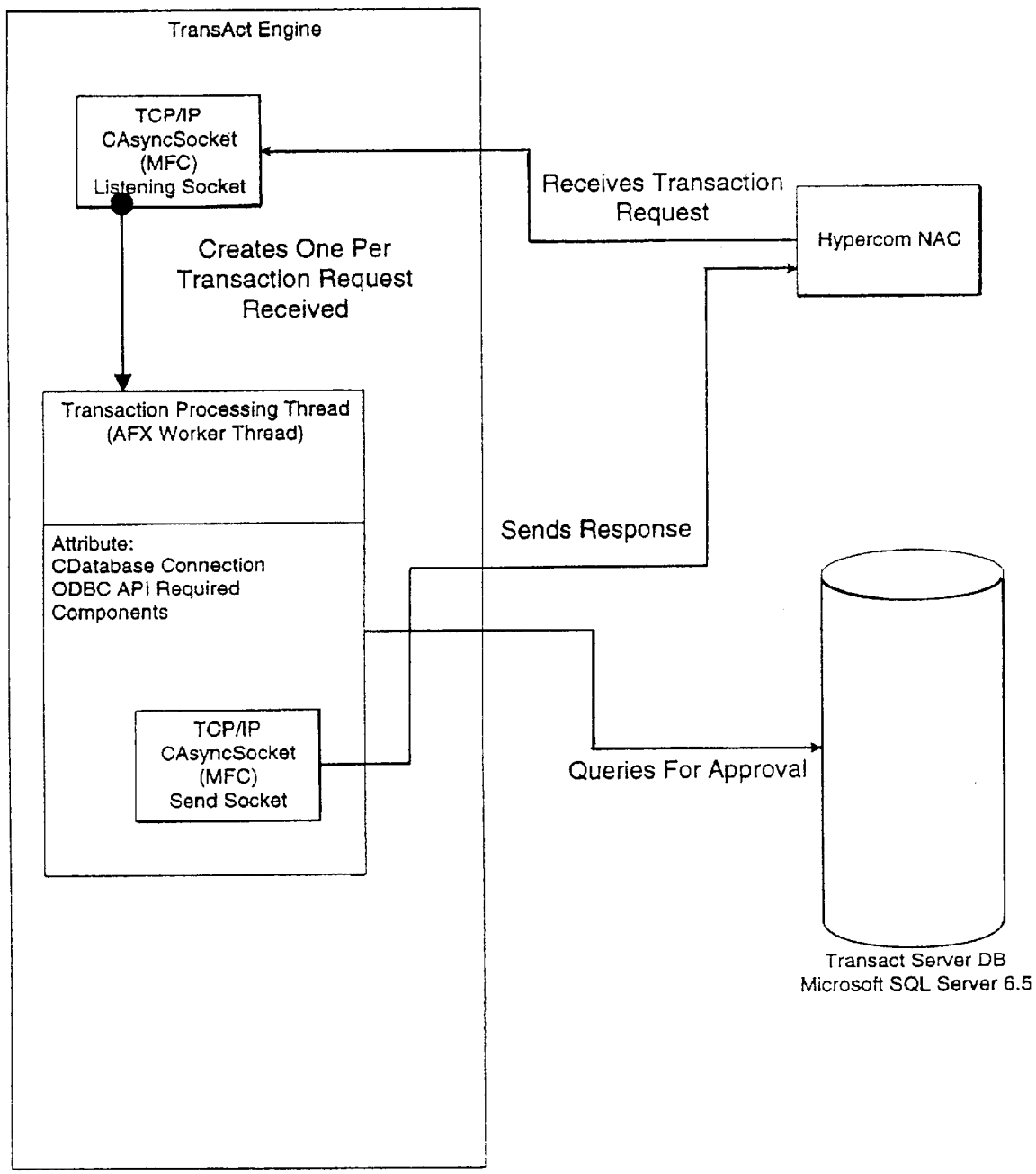
FIG. 13 represents a block diagram representation of various software features of the invention.
Figure 14:
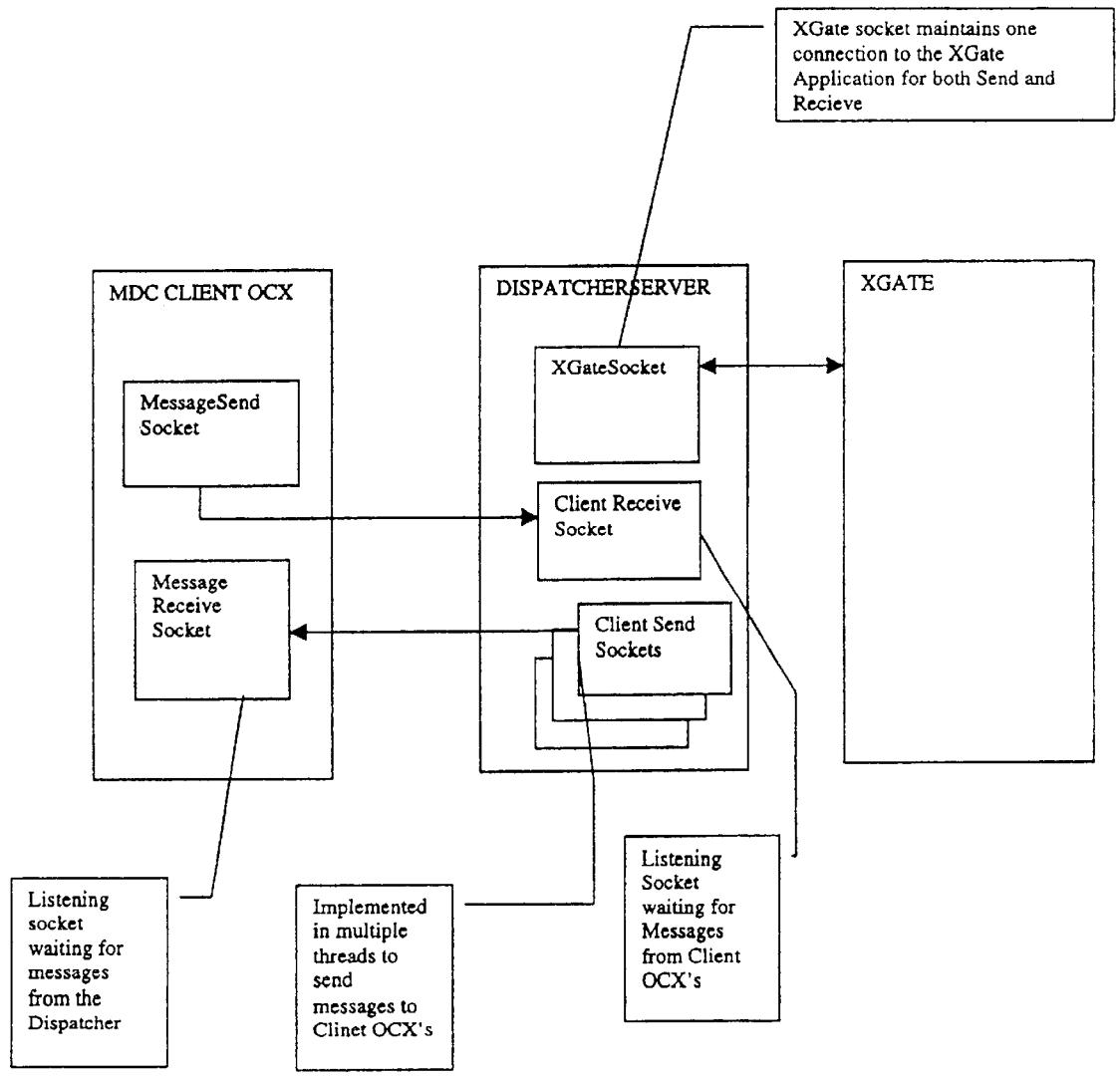
FIG. 14 represents a software related flow chart according to the present invention.
Figure 15:
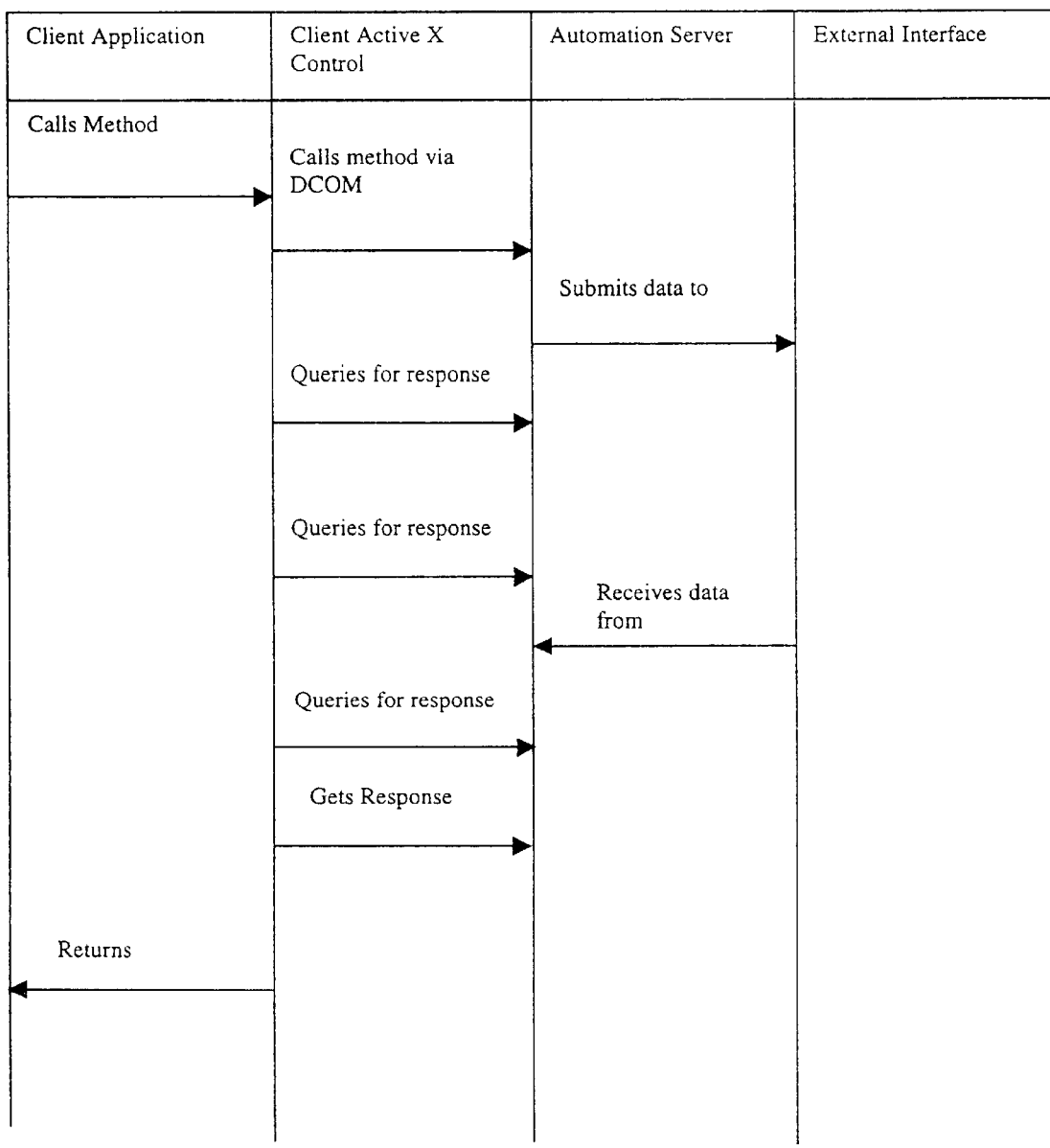
FIG. 15 represents a diagram relating to the software call to automation server blocking method.
Figure 16:
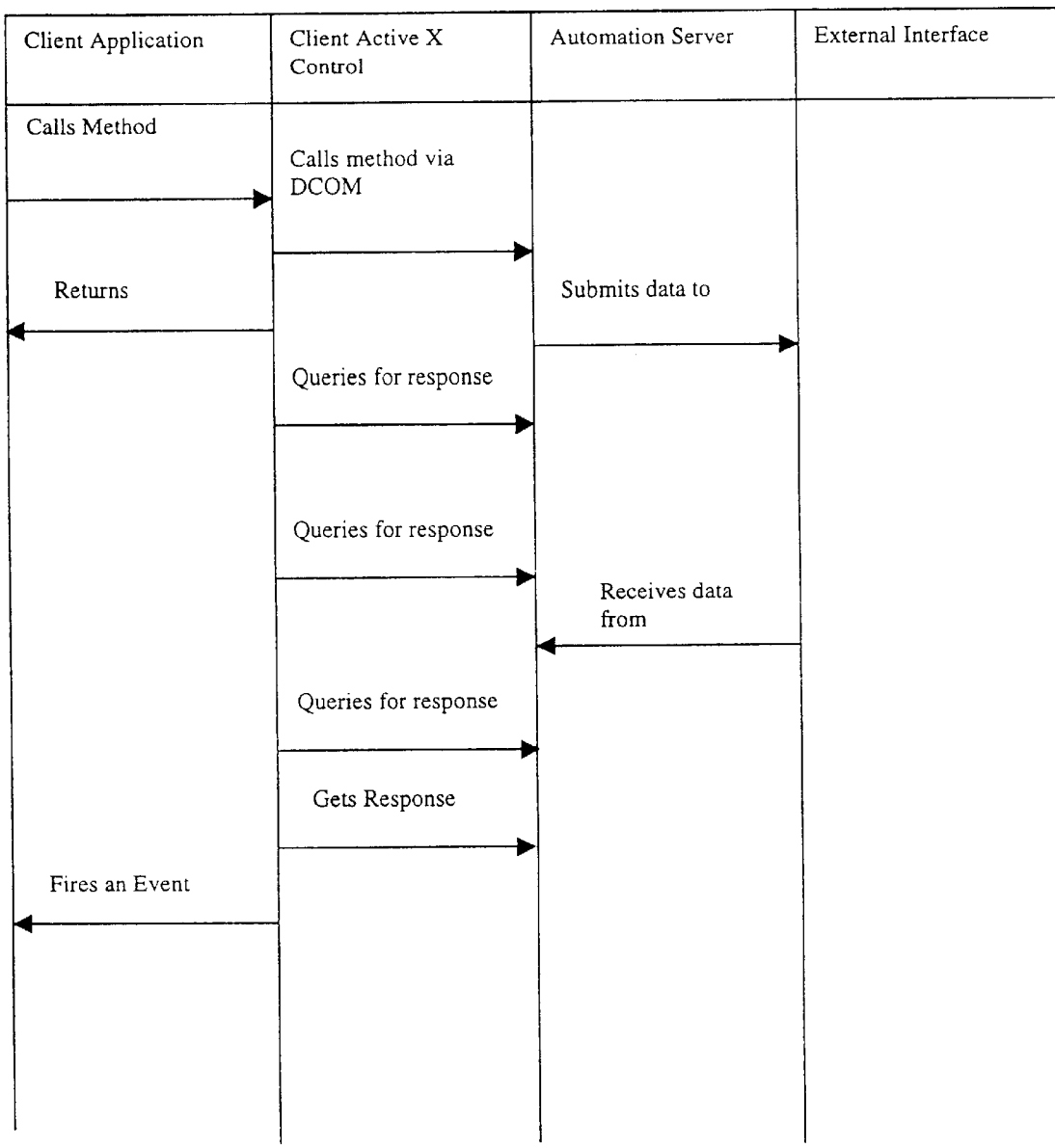
FIG. 16 represents a diagram relating to the software call to automation server non-blocking method.

The overall system diagram illustrated in FIG. 8 coordinates with and is consistent with the general system diagram illustrated in FIGS. 1, 2, 3 and 4. FIG. 12 generally corresponds to the FIG. 8 block diagram and more specifically designates the manufacturer and model number of certain elements of the invention utilized within the block diagram of FIG. 8 designated as the system control center. As illustrated in the FIG. 8 block diagram, the heart of the system control center is designated as the Tranz:Act Server. FIG. 9 illustrates the XGate, Dispatch, Tranz:Act Engine and Tranz:Act card holder database which are implemented by software applications within a conventional network server. FIG. 9 illustrates that the incoming card swipe data is communicated from a particular bus to the XGate system element where the data is converted from its encrypted form into a standardized data format identifying the card number and the amount charged. The System may be configured to accept and transmit additional statistics or survey data as an element of the card swipe data. As explained above, the data response transmitted by the Tranz:Act Server to the system MDC communicates either an "ACCEPTED," status or a "DECLINED" status. An "ACTIVATE" status represents a different form of information which is communicated to a sales outlet data terminal in response to a card sale or credit enhancement transaction.

The FIG. 10 diagram indicates the format of a typical data sequence which might be used to implement a system according to the present invention. Typically, either an ISO or AAMVA data format will be used for standardization purposes.

The software based Dispatch element receives the converted card swipe data from the XGate element and performs analysis of the first four bytes of the incoming MDC data. Those first four bytes are used to identify the received data into one of the following categories:

1. Card swipe data;
2. GPS position information;
3. Driver sign on;
4. Driver sign off;
5. Hot key messages;
6. Custom text messages;
7. End of day data summary.

The foregoing list is not all-inclusive, but is provided merely to illustrate the function of the Dispatch element of the Tranz:Act Server.

Figure 11:
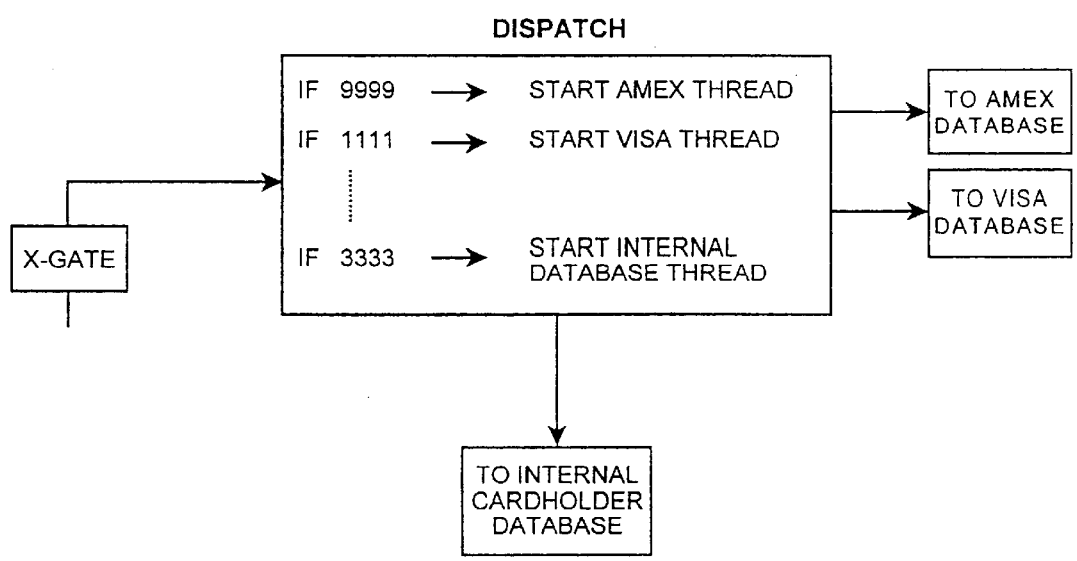
FIG. 11 illustrates the operation of the Dispatch element of the Tranz:Act Server illustrated in FIG. 8.

FIG. 11 illustrates a situation where the first four bytes of MDC data correspond to card swipe data and demonstrates how the Dispatch element of the invention functions to parse the data into an appropriate category. As will be explained below, the particular card swipe data content may inform the Dispatch element that the card swipe data is an American Express card, a VISA card or some other commercial credit card. The Dispatch element responds to that commercial credit card identification by sending the card swipe data to the remote credit card customer database as illustrated in the FIG. 2 block diagram to identify the card user and card credit status. As illustrated in FIG. 11, a particular data content such as, for example, "3333" can be used to designate to the Dispatch element that the card swipe data has designated a proprietary transit card where the relevant data is found within the transit user database stored in the Tranz:Act Server as illustrated in FIGS. 2 and 9.

In the preferred embodiment of the invention, the Tranz:Act Server database search engine takes the form of Microsoft SQL Server V6.5. Each incoming fare assessment transaction is configured in software as a separate program referred to in the software art as a "thread." Each thread receives the incoming card swipe data and performs a separate search process independent of all ongoing or subsequently received search processes. Each new incoming transaction starts a new thread. The transit user database is configured within the Microsoft SQL database into four separate columns designated Column 1, Column 2, Column 3 and Column 4. Each thread is configured to perform a parallel search of each column simultaneously resulting in a nearly instantaneous search completion where the response of a search of a one million record database can be achieved in less than one millisecond. The implementation of such a thread database processing routine allows essentially an unlimited number of transaction to be processed simultaneously by the server on the transit user database with a less than one millisecond response time for each inquiry.

When the transit card user number being searched for is located, the credit status is evaluated and compared with the amount to be charged. If the credit on account exceeds the amount to be charged, the system software generates "ACCEPTED" output which is immediately transmitted to the bus MDC. At the same time, the database software reduces the customer's credit balance by the amount of the fare charge. As part of this database search, the time of the inquiry is recorded and the software compares the time of the current search with the time of the last data transaction relating to that same record. If the time differential between those two record access times is less than a predetermined time window such as one hour, the system will assume that the user is implementing a bus to bus transfer which is typically processed as a no-charge transaction. In such cases, the card user's credit balance is not reduced.

In response to an MDC card swipe, the system of the present invention can accomplish all data transmission and database search activity and retransmit a response to the bus MDC in a period typically no longer than about one second. When the card swipe data corresponds to a non-proprietary commercial credit card and the system is required to access a remote credit card customer database, the processing time will be increased from one second or less to a time on the order of about two to four seconds. From the standpoint of the bus operator and passenger, the response to a card swipe is essentially instantaneous.

The FIGS. 13, 14, 15 and 16 diagrams further describe and illustrate the preferred embodiment of the software used to implement the preferred embodiment of the invention.

Approximately two gigabytes of the server hard drive is allocated in the prototype system for use by the Microsoft SQL server software and its database.

The basic embodiment of the present invention actually tested to date provides only two tables within the SQL software: the CardHolderInfo and CardInfo tables. The CardHolderInfo table contains information about the card holder such as: card holder name, address, phone number, etc . . . . The CardHolderInfo table is keyed to an unique integer value for each record in the table. This table has a relationship to key in the CardInfo table. This table is used to obtain information about the card holder. The CardInfo table contains the card number, the available balance and key to the CardHolderInfo table. The card number is stored as four sequences of integers which accommodates standard sixteen character card numbers as well as any other type of card number. The four integer sequences are stored as clustered key values to increase the search speed. The database is tuned to allow the MaxNumber of worker threads to be matched to available RAM on the server. Available connections is presently set at 302.

The Tranz:Act Engine currently uses Microsoft Visual C++ Version 5.0 and is referred to as a Microsoft Foundation Class based Dialog application. The software supports only one main window with a limited user interface.

As the Tranz:Act Engine is started, an IP connection is established with the Hypercom NAC/IEN box. Also, database connections to the Tranz:Act Server Database are allocated. Three hundred connections have been allocated for the prototype system. The Tranz:Act Engine maintains a TCP/IP connection to the Hypercom NAC/IEN box. The TCP/IP session is maintain using the MFC (Microsoft Foundation Class) CAsycronousSocket Class. As data is received over the IP Connection, the data is parsed. After the parsing is complete, a new thread is started.

For each new thread that is started, a connection to the database is passed to thread. Each thread takes the parsed data and performs a database select. The select is based on the Card Number sequences. For example, SELECT balance FROM CardHolderInfo WHERE CardNum_Seq1=1111 AND CardNum_Seq2=2222 AND CardNum_Seq3=3333 AND CardNum_Seq4=4444. This select statement is very fast using the low level ODBC Direct calls instead of any other types of API's such as MFC ODBC, ADO or DAO. Once the Balance has been retrieved, a simple check is done on the transaction and the acceptance or decline status is sent over a new separate IP connection. The database table is then updated.

Although each new thread is instantiated on the STACK, the data that is parsed and passed to threads is allocated on the HEAP which increases the speed of the systems. All required elements for the database connections are acquired at startup time. This includes the HANDLE to the statement (HSTMT) and the database connection which makes database access very rapid.

As illustrated in the FIG. 13–FIG. 16 diagrams, the system utilizes a variety of sockets. The Dispatch Client OCX or .exe Message Send Socket is configured as follows: This socket will open a connection to the Dispatch Server Client Receive Socket. The data sent by this socket will be provided via a public interface from the OCX or .exe. The public interface will be exposed to a client application. Once the data has been provided, it will be sent to the Dispatcher Client Receive Socket and the socket connection will be closed by the MDC Client OCX or .exe Send Socket. Before the data is sent over this socket connection it will be formatted via the OCX or .exe to the acceptable XGate software excluding the job number which will be furnished by the Dispatch server application.

The MDC Client OCX or .exe Messages Receive Socket is configured as follows: This socket will be opened and listening at all times. It will receive data from the Dispatch Server Client Send Socket. The Dispatch Server Client Socket will close the connection once the data has been sent. The data will be the raw data received from the XGate application. This data will be parsed by the MDC Client OCX or .exe and made available via a public interface method/event.

The Dispatch Server XGate Socket is configured as follows: This socket will be connected to the XGate application at all times the Dispatch Server application is running. This socket will be used for both receiving and sending messages to the XGate application. The only parsing of the data received will be for the Unit Number. The Unit Number received from XGate will be mapped to an IP address corresponding to a Dispatch Client OCX or .exe. Once the Unit Number has been parsed, the Dispatch Server will instantiate a new thread. The thread will create a separate Client Send Socket.

The Dispatch Client Send Socket is configured as follows: A new Dispatcher Client Send Socket will be created for each message received from the XGate application. This socket will send the raw message to the appropriate Dispatch Client OCX or .exe Receive Socket. Once the data has been sent, this socket will close the connection.

The Dispatch Client Receive Socket is configured as follows: This socket will listen to accept connections at all times the Dispatch Server application is running. It will receive data correctly formatted to pass off to XGate application. Once a complete message has been received from a Dispatch Client Send Socket, it will be sent to the XGate application via the Dispatch Server XGate Socket.

In connection with an authorized vendor's sale of a transit card as outlined in the FIG. 4 block diagram, the Tranz:Act Engine will receive card swipe data from the merchant. As illustrated in FIG. 9, the Tranz:Act Engine will identify the IP address of the card swipe terminal as a "merchant" terminal as distinguished from a vehicle-mounted MDC. The system will then process the transaction as a transit card purchase by activating the account number of the pre-encoded number on the transit card being sold. The initial card credit balance is keyed in by the merchant along with a PIN number and custom defined information as required by the merchant or by the transit authority.

The merchant terminal utilizes a card reader which decodes the card swipe data stored in the FIG. 10A ISO data format and directly transmits that ISO format data either by land line or by wireless CDPD modem to the NAC/IEN box depicted in the FIG. 12 system diagram. When the Tranz:Act Engine receives such FIG. 10A ISO format data, the system is configured to bypass the XGate and Dispatch elements and directly process the ISO format data.

The foregoing explanation clearly demonstrates the nearly instantaneous real time operation of the present invention which allows a mobile transit vehicle to receive passengers using transit cards which essentially instantaneously communicates the "ACCEPT" or "DECLINED" status of the transit card via the bus MDC. Through appropriate security measures, the holder of a transit card can conveniently access his account maintained on the system control center database to determine its current credit balance, to add credit or to deactivate the card. Transit management is provided on a real time basis with comprehensive data and analysis regarding every one of its vehicles within its system by accessing and receiving data from a single centrally located Internet-connected system control center. All data and data analysis is accomplished by software on a real time basis rather than by wage earning employees and the system is maintained operational at relatively low cost on a twenty-four hour by seven day basis. The transit system pays a fee for use of the present system on a per-transaction basis or, alternatively, on the basis of a pre-negotiated fixed fee per month, per quarter or per year. Both an unlimited number of buses as well as an unlimited number of transit systems can be operated and managed by means of a single system control center.

Using the same system elements and software, the system of the present invention can be readily adapted to other analogous uses. For example, the system can be adapted to function as a wireless airliner arrival and departure tracking system by providing a an MDC at airline terminal gates and providing the flight crew with the airline counterpart of a transit card to allow the system to identify the airline company and the flight number corresponding to a particular aircraft and crew. The wireless MDC transmits the card data supplemented by time of day and gate location data to advise airline management in real time via the Internet of the exact flight arrival and departure information for all aircraft within its entire potentially global route system.

The system of the present invention may also be readily adapted for use with crew shuttles, delivery trucks, tour coaches and rental cars and trucks. For the rental vehicle application, a renter may use either a prepaid or a post pay card to check out and check in rental vehicles. The vehicle-based MDC allows the system to automatically monitor vehicle location, mileage driven, and other data in real time. The rental vehicle check-in process may be fully automated by having the customer swipe his card through the vehicle MDC. The software can readily be configured to advise management when a rented vehicle is approaching the pre-designated vehicle turn-in location or where a rented vehicle is located at the scheduled turn in time to provide advance notice that a rented vehicle will either be turned in early, on time or late. Rental vehicle utilization rates may be substantially increased as a result of such real time vehicle location data.

Figure 17:
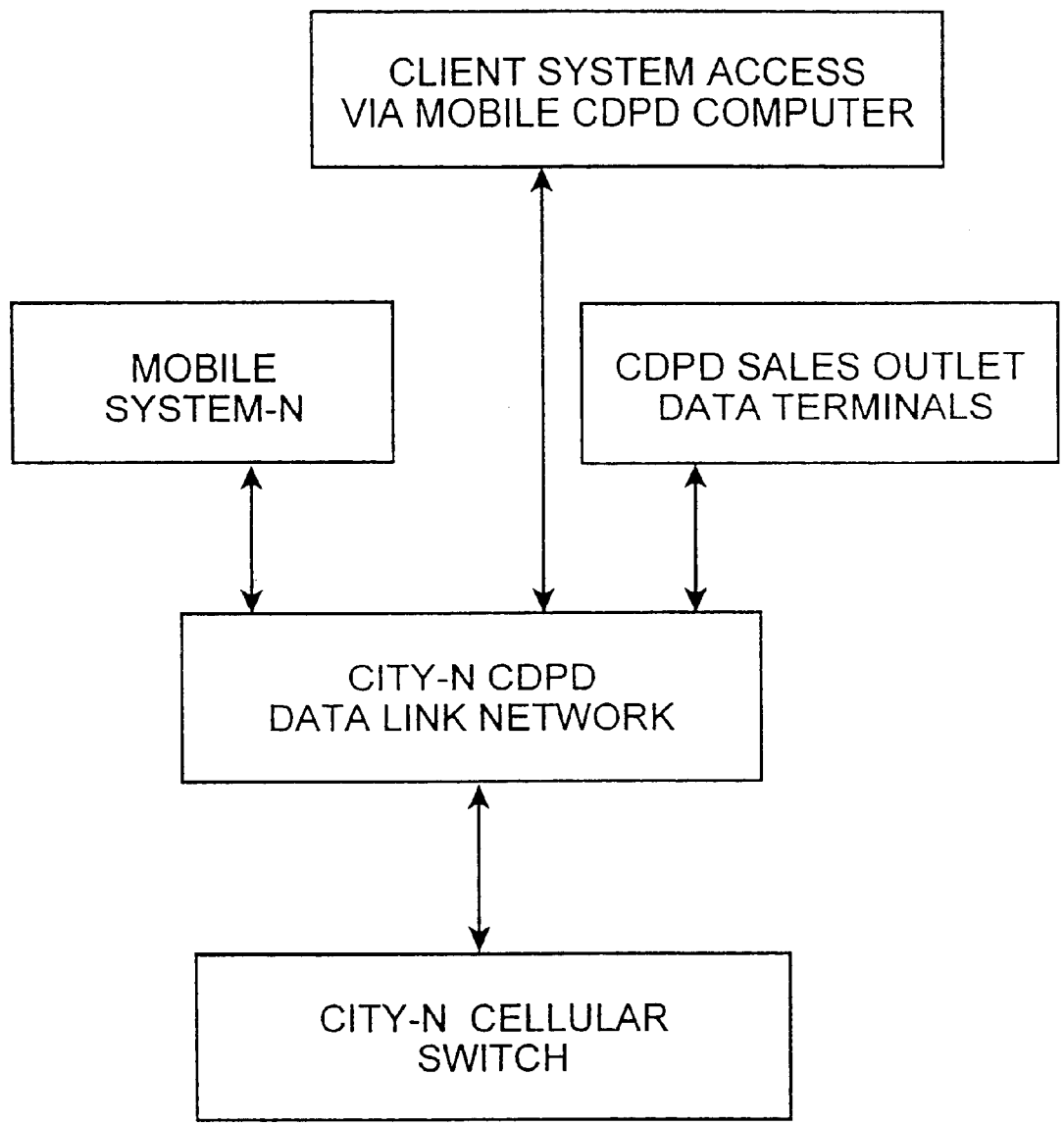
FIG. 17 represents a block diagram illustrating a modification of the system according to the present invention.

The system of the present invention can not only be used in connection with transit systems, but may also be readily adapted to a wide variety of smaller, less complex transit providers including airport rental car shuttle services, airport hotel shuttle services and medical transport vehicles. The FIG. 17 block diagram illustrates yet another modification or variation of the inventive system where transit client management can utilize a mobile CDPD miniature or laptop computer to access the system control center rather than relying upon a hardwired connection to the Internet. Satellite based RF data link systems such as the proposed Teledesic system can also be used to link the mobile system elements to the system control center. Although the present invention has been described in connection with the use of prepaid transit cards, the system can readily accommodate post pay cards and incorporate a conventional periodic customer billing system based on actual card usage. Numerous additional variations and modifications of the system of the present invention would be readily apparent to one of ordinary skill in the art.

We claim:

1. A method for remotely monitoring and managing the operation of fare charging passenger carrying vehicles forming elements of a transportation system as each vehicle travels a route for picking up and delivering passengers having previously established passenger accounts, comprising the steps of:
   a. maintaining a wireless two-way data link between each vehicle and a system control center having stored passenger account data;
   b. maintaining a two-way data link between the system control center and a system management center to allow the system management center to exchange data with the system control center and with each vehicle;
   c. transferring a fare charge schedule defining fare charges based on designated criteria from the system management center to the system control center;
   d. transmitting the identity of each passenger boarding each vehicle to the system control center;
   e. matching the passenger identity with the related passenger account within the system control center, assessing an appropriate fare charge against the passenger account and transmitting a passenger account status report to the vehicle indicating that the fare charge has been accepted or declined; and
   f. controlling vehicle passenger boarding in response to receipt of the passenger status report.

2. The method of claim 1 including the further step of providing an interface between each passenger and the related passenger account data stored on the system control center to allow the passenger to add value to his account.

3. The method of claim 2 including the further step of providing an interface between the system control center and a remote credit card database to allow fare charges to be assessed against a passenger's credit card.

4. The method of claim 3 including the further step of providing an interface between the passenger account and the remote credit card database to allow value to be transferred to the passenger account from the passenger's credit card.

5. The method of claim 1 wherein the vehicle transmits vehicle identification and vehicle location data to the system control center.

6. The method of claim 5 wherein the vehicle operates on a scheduled route defined by the system management center and wherein the system control center receives vehicle identification, time and location data and transmits schedule compliance data to the vehicle.

7. The method of claim 1 wherein the vehicle transmits passenger boarding data to the system control center.

8. The method of claim 7 wherein the vehicle transmits passenger boarding location information to the system control center.

9. The method of claim 6 wherein the system control center assesses an appropriate fare as a function of time of day, day of the week or holiday status.

10. The method of claim 1 wherein the vehicle periodically transmits vehicle system operating data to the system control center.

11. The method of claim 1 wherein the vehicle periodically transmits an operating day data summary to the system control center.

12. The method of claim 11 wherein the operating data summary is transmitted to the system control center at the end of an operating day.

13. A method for remotely monitoring and managing the operation of first and second groups of fare charging passenger carrying vehicles forming elements of first and second transportation systems as each vehicle travels a route for picking up and delivering passengers having previously established passenger accounts, comprising the steps of:
   a. maintaining a wireless two-way data link between each vehicle of the first and second groups of vehicles and a system control center having stored passenger account data;
   b. maintaining a two-way data link between the system control center and first and second system management centers to allow each system management center to exchange data with the system control center and with each vehicle within a system group;
   c. transferring fare charge schedules defining fare charges based on designated criteria from the first and second system management centers to the system control center;
   d. transmitting the identity of each passenger boarding each vehicle to the system control center;
   e. matching the passenger identity with the related passenger account within the system control center, assessing an appropriate fare charge against the passenger account and transmitting a passenger account status report to the vehicle indicating that the fare charge has been accepted or declined; and
   f. controlling vehicle passenger boarding in response to receipt of the passenger status report.

14. The method of claim 13 including the further step of providing an interface between each passenger and the related passenger account data stored on the system control center to allow the passenger to add value to his account.

15. The method of claim 14 including the further step of providing an interface between the system control center and a remote credit card database to allow fare charges to be assessed against a passenger's credit card.

16. The method of claim 15 including the further step of providing an interface between the passenger account and the remote credit card database to allow value to be transferred to the passenger account from the passenger's credit card.

17. The method of claim 13 wherein the vehicle transmits vehicle identification and vehicle location data to the system control center.

18. The method of claim 17 wherein each vehicle operates on a scheduled route defined by the related system management center and wherein the system control center receives vehicle identification, time and location data and transmits schedule compliance data to each vehicle.

19. The method of claim 18 wherein the system control center assesses an appropriate fare as a function of time of day, day of the week or holiday status.

20. The method of claim 13 wherein the first transportation system and the first group of vehicles is located in a first geographic region and wherein the second transportation system and the second group of vehicles is located in a second geographic region.

* * * * *